Patented Sept. 5, 1922.

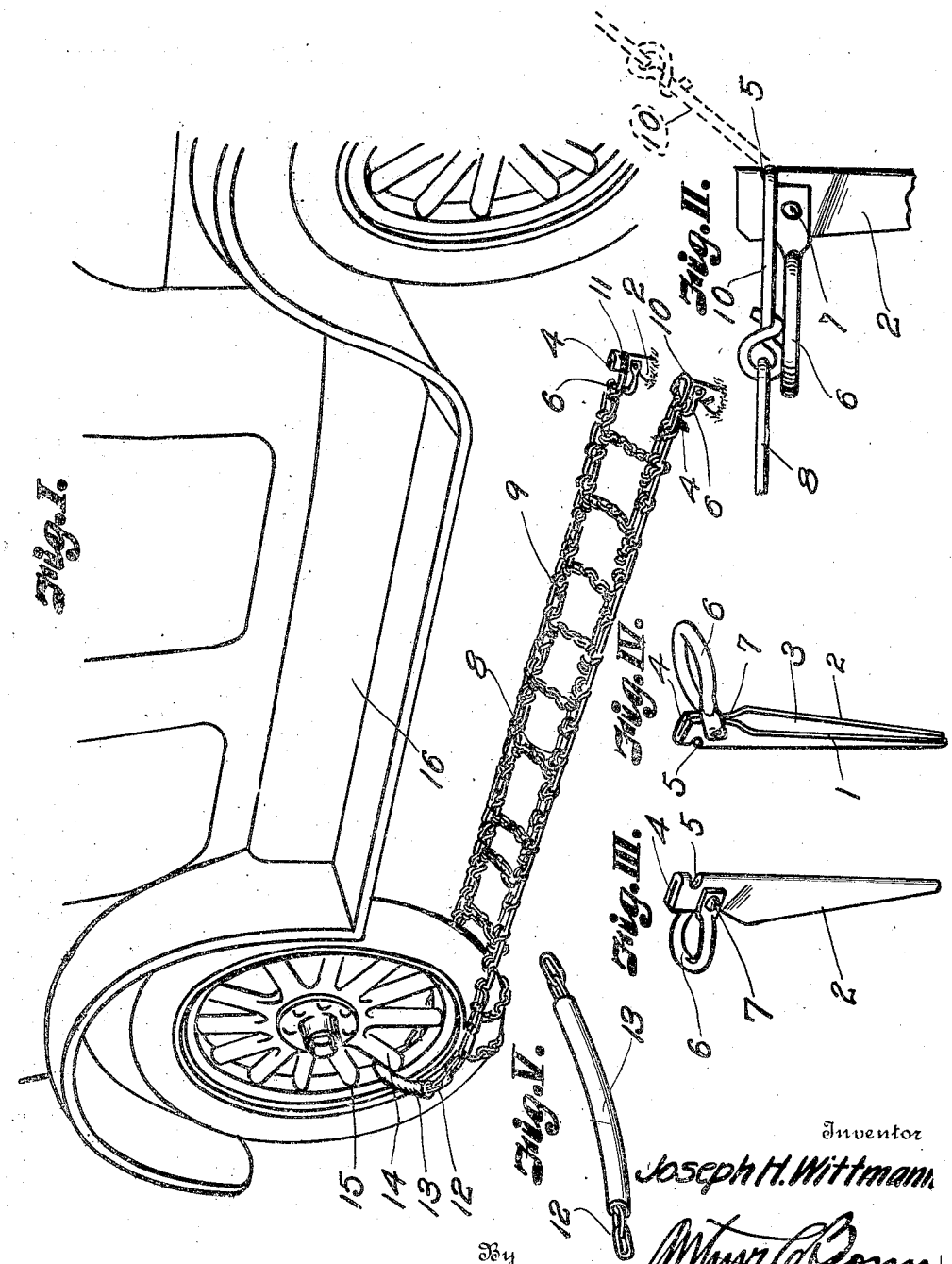

1,427,889

UNITED STATES PATENT OFFICE.

JOSEPH H. WITTMANN, OF KANSAS CITY, MISSOURI.

STAKE.

Application filed May 5, 1919, Serial No. 294,856. Renewed July 17, 1922. Serial No. 575,636.

*To all whom it may concern:*

Be it known that I, JOSEPH H. WITTMANN, a citizen of the United States, residing at Kansas City, in the county of Jackson and State of Missouri, have invented certain new and useful Improvements in Stakes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a chain anchoring stake adapted primarily to anchor a chain or flexible connection which is used to assist a motor vehicle in pulling itself out of the mud.

Heretofore it has been customary to use a rope, cable or chain, one end of which may be attached to a stake driven in the ground or to a tree, and the other end to one of the drive wheels of the motor vehicle and then start the engine so that the wheel will wind up the flexible connection and thus enable the motor vehicle to be pulled out of the hole by its own power. In actual practice, the car not infrequently starts out of the hole or mud suddenly and with considerable speed and where stakes are used, the stakes are sometimes over-run so that as the car passes over the stake, it is pulled from the ground and whips against the mud guard or fender causing considerable damage.

It is one of the purposes of my invention to provide an anchoring stake for a flexible connection as, for example, a chain, having means for releasably engaging the flexible connection so that in the event that the stake is over-run, the flexible connection will automatically release itself so as to avoid the objections above enumerated.

In the drawings,

Fig. I is a fragmentary perspective view of a motor vehicle having a flexible connection anchored to a stake constructed in accordance with my invention.

Fig. II is a fragmentary side elevational view of a stake to which the flexible connection is secured, the dotted lines indicating the position of the flexible connection as it is releasing itself from the stake.

Fig. III is a detail perspective view of a stake constructed in accordance with my invention, and Fig. IV is a reverse view of the stake shown in Fig. III, and Fig. V is a perspective view of a rubber covered connection chain.

In carrying out the invention I prefer to construct a stake of a single piece of sheet metal having diverging walls 1 and 2 to form a resisting surface 3 of considerable area, the upper ends of the side walls being crimped together, as at 4, to form a head, the front end provided with a flexible connection engaging notch 5 preferably designed to receive a link of a chain or link on the end of a flexible connection. I also prefer to provide a bail or handle 6 in the form of a loop having its ends fastened to the head 4 by rivets or other suitable connection 7 whereby the stake may be readily removed from the ground by an upward pull on the handle or bail 6. 8 and 9 designate the two side members of an anti-skid chain which may serve as a flexible connection, the links 10 and 11 of which may engage the notches 5 of the stake and the opposite ends of the members 8 and 9 being secured together by a chain 12 preferably covered by rubber 13 to embrace a spoke 14 of the wheel 15 of a motor vehicle 16.

By reference to Fig. II it will be observed that that handle or bail 6 serves a dual purpose. Not only is it adapted to be engaged to remove the stake but when it is in the horizontal position shown in Fig. II it serves as a shelf or support for the link 10 so that the link 10 may not swing down below a horizontal plane and thereby become wedged with respect to the stake. The bail 6 cannot drop below a horizontal plane on account of the swaged-out portions of the stake forming an abutment. This construction is important as it prevents liability of the link and stake becoming wedged together so as to interfere with the releasing of the chain when the motor vehicle passes the stake or stakes.

When the parts are in the position shown in Fig. I and the engine is started, the wheel 14 will wind the chain about the periphery of the wheel so that it will run upon the chain until the wheel passes between the stakes 10 and 11, whereupon the chain will be released from the notches as indicated in dotted lines in Fig. II. After the chain members have been released from the stakes, the stakes may be removed from the ground by an upward pull exerted on the bail 6.

From the foregoing it will be apparent that the stake may be inexpensively constructed, that it will be efficient in operation and that liability of accidents due to its use will be wholly eliminated.

What I claim and desire to secure by Letters-Patent is:

A stake comprising a piece of sheet metal bent back upon itself to form diverging wings, the wings being crimped together at the upper portion of the stake and having a notch in one face thereof, and a loop connected to the crimped portion of the stake.

In testimony whereof I affix my signature.

JOSEPH H. WITTMANN.